Patented May 14, 1935

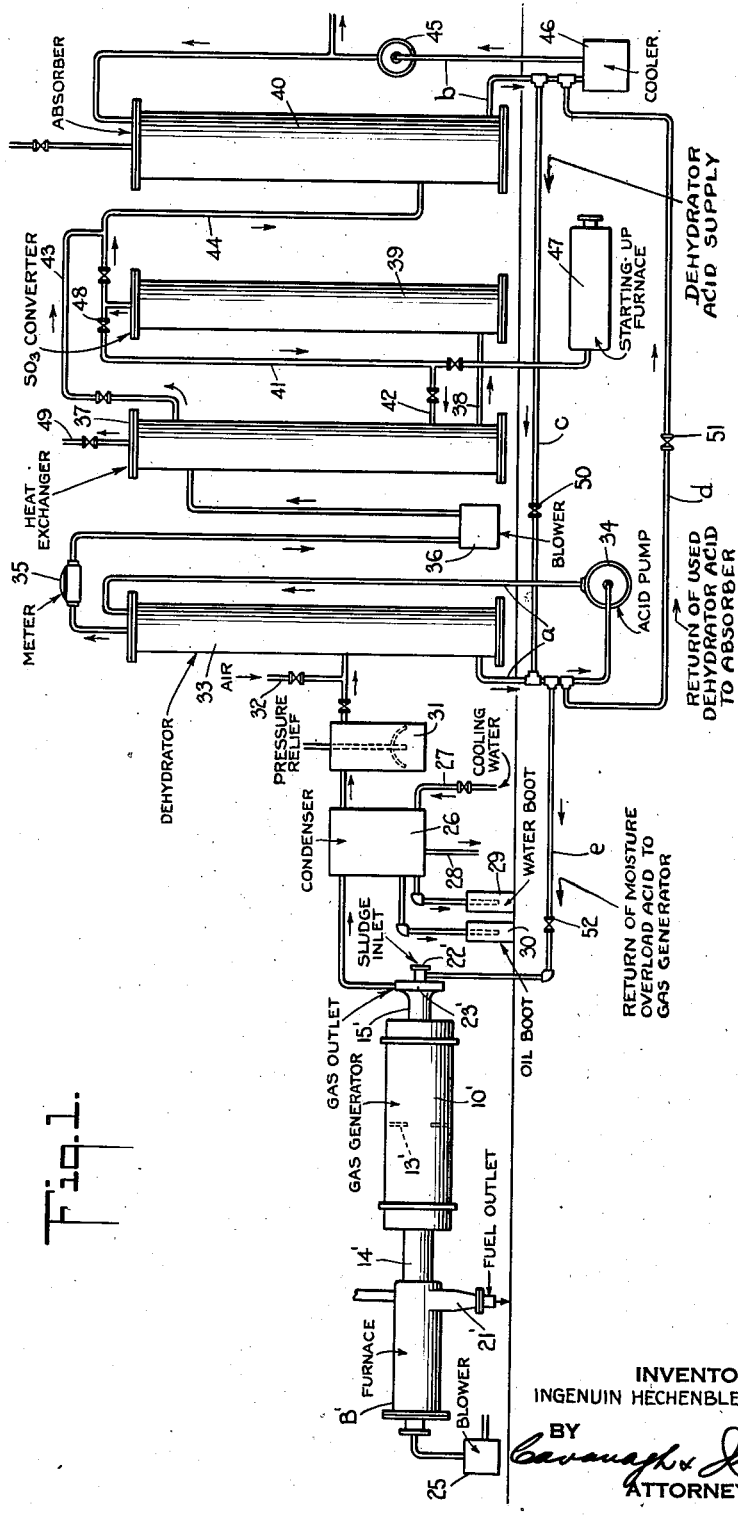

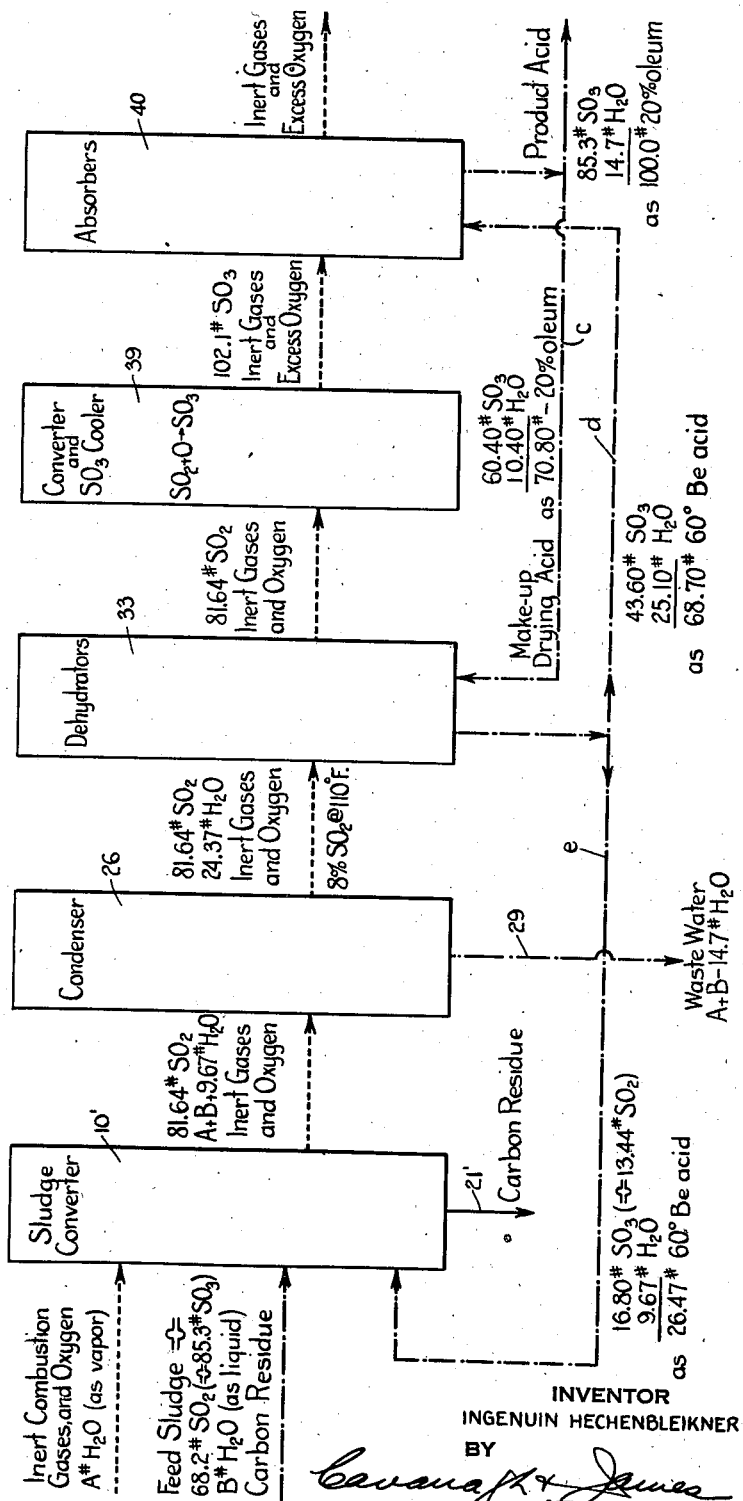

2,001,359

UNITED STATES PATENT OFFICE 2,001,359

PROCESS OF MAKING CONCENTRATED SULPHURIC ACID OR OLEUM

Ingenuin Hechenbleikner, Charlotte, N. C., assignor to Chemical Construction Corporation, Charlotte, N. C., a corporation of Delaware Application November 11, 1931, Serial No. 574,244

5 Claims. (Cl. 23—175)

This invention relates to a method of making a concentrated sulphuric acid or oleum product, and relates more particularly to the making of such a product from a moisture loaded sulphur dioxide gas; and has special reference to the provision of a contact sulphuric acid system in which concentrated sulphuric acid or oleum may be manufactured from sludge bodies containing sulphuric acid or its compounds.

In the refining of petroleum, tar and other organic materials, the crude oil or its fractional or cracked distillates is treated with sulphuric acid or with oleum which tends to remove the undesirable compounds therein, reacting therewith to form a mixture which is separated from the treated oil as a tarry sludge, known as petroleum or acid sludge. In the refining of lubricating or other heavy oil stocks, it is not only desirable to use acid of uniformly high strength, but in many cases oleum of 20% strength or higher. Various methods of treating the petroleum or acid sludge to effect a recovery of the sulphuric acid content or compounds therein have heretofore been suggested and practiced; and for the purpose of petroleum refining, it is very desirable to not only recover the sulphuric acid from the sludge, but to convert the same readily and economically to sulphuric acid of high strength and as aforesaid in many cases to oleum of 20% strength or higher.

In my copending application Serial No. 568,050 to Treatment of acid sludge, filed Oct. 10, 1931 now Patent No. 1,953,225, I described an improved method for treating acid sludge to recover the sulphuric acid therefrom, this method comprising subjecting a body of the acid sludge to the heat treatment of hot combustion gases to effect a reaction of the sludge body, the reaction being so carried on as to accomplish a reduction of the sulphuric acid content or compounds of the sludge to sulphur dioxide gas. This sulphur dioxide gas obtained substantially free from impurities is then converted to sulphuric acid in a contact or catalytic converter system. In the operation of this process, the $SO_2$ gas is continuously generated in a retort, and when withdrawn from the retort for transmittal to the catalytic converter system, is moisture loaded. To remove the moisture content of the $SO_2$ gas, the gas is first passed through a water condenser and then through a dehydrator, in which dehydrator some of the product acid of the system is circulated, this circulating acid functioning to dehydrate the $SO_2$ gas prior to its delivery to the $SO_3$ catalytic converter. The dehydrating or drying acid in turn serves as a supply for the make-up acid in the absorber of the contact sulphuric acid system.

In the operation of this system and process, the $SO_2$ gas exiting from the condenser contains a variable percentage of moisture depending upon climatic conditions and the temperature of the cooling water for the condenser available at the plant. This variable percentage of moisture enters the drying acid (is absorbed thereby) and frequently this moisture is in such amounts and creates such a dilution of the drying acid that it is impossible to produce, when the diluted drying acid is blended with the total acid production of the system, high strength acid such as 20%, 30% or 40% oleum. Therefore for the production of such high strength acid the $SO_2$ gas exiting from the condenser and entering the dehydrator contains an overload of moisture, the overload or excess of which it is necessary to remove or to abstract from the system. This might be accomplished in most cases by effecting a control of the temperature of the gases exiting from the condenser, but this would involve a careful and expensive governing of the temperature of the cooling water for the condenser and an adaptation of the system to the surrounding and variable climatic conditions.

I have discovered that in the practice of this improved process of treating sludge acid the organic constituents of the sludge react with the sulphuric acid or its compounds in the sludge to evolve $SO_2$ gas and that when free sulphuric acid is added to the sludge, the reaction between the organic matter of the sludge and the added free sulphuric acid is practically quantitative, that is to say, that a given quantity of free acid added to the sludge body may be recovered with approximately 100% yield in the form of sulphur dioxide gas free from other contaminating gases. I have further empirically determined that taking advantage of this fact, all or any desired portion of the drying or dehydrating acid of the system may be diverted from the drying cycle and returned to the sludge retort or gas generator where $SO_2$ gas is re-generated therefrom and in turn returned to the system. I have moreover ascertained that the return acid, that is, the acid diverted from the drying cycle and returned to the gas generator, may be so predetermined in amount or/and dilution as to carry along therewith the moisture overload to the gas generator, which moisture overload may be withdrawn from the system by the condenser. In this way the entire system may be self-contained in acid circulation and the excess or overload moisture may be removed by way of the condenser and in amounts which permit the obtaining at will of any high strength acid, such for example as 20% oleum or higher. Obviously, the amount of water carried into the finished acid product of the plant through the blending of the product acid with the dehydrating or drying acid may be controlled in this way over the entire range of moisture content from no moisture to the maximum amount absorbed from the gases by the acid in the dehydrator depending upon the percentage of the drying acid diverted from the drying cycle and re-converted by the process. Manifestly, I am in this way able to eliminate all or any portion of the water according to the strength of the finished acid required.

This process, which is the prime object of my present invention, not only greatly increases the flexibility of the contact sulphuric acid plant operated in combination with my sludge treatment process, but also enables the plant to produce 100% of its output in a very flexible way at any strength specified by the petroleum refining treatment.

To the accomplishment of this prime object and such ancillary objects as will hereinafter appear, my invention consists in the processes and the steps of the processes hereinafter more particularly described and sought to be defined in the claims; reference being had to the accompanying drawings which show the present embodiment of apparatus employed in the practice of the process, and in which:

Fig. 1 is a diagrammatic layout of a plant in which my sludge treating process (set forth and claimed in my aforesaid copending application Serial No. 568,050 now Patent No. 1,953,225) is shown combined with a contact sulphuric acid system both embodying in combination the principles of my present invention, and Fig. 2 is a flow sheet illustrating one of the examples of operation of the system of my present invention.

Referring now more in detail to the drawings, and having reference first to Fig. 1 thereof, the process of my invention consists generally in producing an initial moisture loaded $SO_2$ gas in a gas generator 10', in flowing the thus generated gas through a water condenser 26, the gas exiting from the condenser containing the moisture overload, in then flowing this gas through a dehydrator 33, thence through an $SO_3$ converter 39, and thereafter through an absorber 40 wherein the product acid of high concentration is obtained. A part of the product acid is utilized as the drying acid in the dehydrator 33 for the removal of the moisture in the gas; and the dehydrator acid or a part thereof containing said moisture overload is in accordance with the principles of the present invention returned to the gas generator where $SO_2$ gas is regenerated therefrom, the return acid being so predetermined in dilution or/and amount that the said moisture overload is withdrawn from the system by the condenser 26.

The gas generator 10' is designed especially for the treatment of acid sludge. This generator preferably comprises a rotary cylinder or drum made of iron or steel preferably interiorly subdivided by means of one or more annular members such as 13' into a plurality of separate and intercommunicating compartments. This drum retort is provided at its opposite ends with reduced cylinder sections 14' and 15' respectively which serve for the ingress and egress of the reacting constituents and resulting products for the retort. The construction and design of this retort may be varied within substantial limits and for a small plant such for example as a plant of two sludge ton daily capacity this retort may have an inside length of from 8 to 10 feet and an inside diameter of 2 feet. The rotational speed imparted to this retort may be of the order of 16 R. P. M.

The cylindrical end section 14' of the retort is made to serve as the intake end for combustion gases produced in a furnace B' with which is associated a furnace blower 25 and the opposite cylindrical end section 15' of the retort is made to serve as the exit or expulsion end for $SO_2$ gases produced in the retort or gas generator. Where the gas generator is employed for the treatment of acid sludge, the gas exit end 15' thereof is also made to serve as the inlet end for the acid sludge, the sludge being introduced into the retort 10' through a feed pipe 22', and the opposite end 14' is made to serve as the expulsion end for the carbonaceous residue of the sludge, the carbonaceous residue being removed from the system through a hopper 21', which hopper is sealed at its bottom by means of a slide door or the like. Since the retort or gas generator 10' is rotatable, the joints between the retort and the combustion furnace B' at one end and those between the retort and the gas outlet head 23' at the other end are suitably packed with some stuffing material. It is highly desirable to make these joints air-tight so as to prevent ingress of atmospheric air into the retort at either end or the loss of gases from the retort.

The produced gases containing $SO_2$ discharging from the retort and exiting at the gas outlet 23' are first led through the condenser 26 which may be cooled by water entering through the pipe 27 and passing out through the pipe 28. In this condenser the water and the small amount of oil present in the exit gases are condensed, and these separating into stratified layers are readily withdrawn into the water and oil boots 29 and 30. This condenser is substantially the only equipment needed for conditioning the gases for conversion to sulphuric anhydride. If desired a simple scrubber may also be employed for removing the small amount of lighter hydrocarbons which are distilled off in the retort. However, I have found it unnecessary to employ even such a scrubber. If desired, in order to prevent an undue rise in the pressure in the plant or system, a pressure relief valve such as 31 may be employed following the condenser 26.

The remainder of the plant apparatus illustrated in Fig. 1 is intended for the subsequent conversion of $SO_2$ to sulphuric anhydride and sulphuric acid. Air for the oxidation of $SO_2$ is introduced at 32 into the gas line, and the gas and air mixture is then passed through the dehydrator or drying tower 33 which is supplied with a stream of sulphuric acid moving countercurrent to the gas flow under the action of an acid pump 34 and circulating in the pipe system $a$, the sulphuric acid serving the purpose of drying the air and gas mixture. This mixture then passes through an orifice meter 35 into and through the blower 36 which acts in conjunction with the blower 25 of the furnace to cause or induce the gas flow through the system. From the blower the gas mixture is delivered to a heat exchange device 37 which functions to preheat the gases to bring them up to suitable conversion temperatures. It will be understood that the gases having passed through the condenser and drying tower are cooled to a temperature below the catalytic conversion temperature and therefore require reheating.

The air and SO₂ gas mixture pass from the heat exchanger 37 through the pipe 38 into a catalytic converter 39 of any suitable design or construction. The converted gases (SO₃) discharging from the catalytic converter 39 are then led into the absorption tower 40 and if desired a part of these gases may be bypassed through the pipes 41 and 42 into and through the heat exchanger 37 for the purpose of supplying the heating medium for the heat exchanger, and conversely for the purpose of cooling the SO₃ gases to the desired absorption temperatures. The cooled SO₃ gas then returns through the pipe 44 leading to the absorption tower 40. In the absorption tower 40 the converted SO₃ is absorbed in the usual manner by means of acid which is supplied by a pump 45 and circulates through the pipe system $b$. The sulphuric acid produced in the absorption tower is led therefrom into the cooler 46.

In starting up the converter apparatus, a starting up furnace 47 may be utilized, this starting up furnace functioning to supply hot products of combustion to the heat exchanger 37 through the pipe 42; and at such time the valve 48 in the pipe line 41 is closed. Until the heat exchanger acquires the desired temperature, these combustion products may be vented through the outlet 49 to atmosphere.

The contact sulphuric acid system of the process is self-contained in the supply of sulphuric acid for the absorber 40 and for the dehydrator 33. To accomplish this, some of the product acid of the system obtained in the absorption apparatus 40 is circulated to the dehydrator 33 and serves as the make-up acid therefor, and conversely the diluted sulphuric acid of the dehydrator 33 is returned to the absorber 40 and serves as supply for the make-up acid for the absorber. Accordingly, the pipe system $a$ of the dehydrator 33 and the pipe system $b$ of the absorber 40 are interconnected by a pipe system $c$ through which the product acid is delivered to the dehydrator controlled by means of a valve 50 and a pipe system $d$ through which the drying or dehydrating acid is delivered from the dehydrator back to the absorber, the flow of the latter being controlled by means of a valve 51. While one drying tower and one absorption tower is shown in Fig. 1 of the drawings, it will be understood that dehydration may be accomplished in a plurality of towers arranged in series and absorption may be accomplished by a plurality of absorption towers arranged in series. Where, as in examples VII and VIII, given below, the dehydrating acid is diluted in the drying cycle to 60° Baumé and where the product acid is concentrated to such high strengths as 20% oleum, it is preferred to employ two drying towers and two absorption towers, one drying tower serving to circulate a 60% acid and the other a 98% acid, and one absorption tower serving to circulate the oleum and the other absorption tower serving to circulate a 98% acid. In this case the dehydrating towers are interconnected so that the higher strength acid of one tower may serve as the make-up for the circulating acid of the other tower and the absorption towers are also interconnected so that the lower strength acid of one tower may serve as the make-up for the circulating acid of the other tower. The tower systems are otherwise interconnected, as shown in Fig. 1 of the drawings, for the controlled flow of the acid in both directions.

In the operation of this system and process, the SO₂ gas exiting from the condenser 26 contains a variable percentage of moisture depending upon climatic conditions and the temperature of the cooling water for the condenser available at the plant. This variable percentage of moisture is absorbed by and enters the drying acid in the dehydrator 33 and creates too great a dilution of the circluating acid of the system to permit in a practical way of the production in the system of high strength acid such as 20%, 30% or 40% oleum. Therefore for the production of such high strength acid, the SO₂ gas exiting from the condenser 26 and entering the dehydrator 33 contains an overload of moisture, which overload it is necessary to remove or abstract from the system. I have discovered as aforesaid that in the practice of this process when free sulphuric acid is added to the sludge in the gas generator 10', the reaction between the organic matter of the sludge and the added free sulphuric acid is practically quantitative, that is to say, that a given quantity of free acid added to the sludge body may be recovered with approximately 100% yield in the form of sulphur dioxide gas free from other contaminating gases. Taking advantage of this fact, I have found that all or any desired portion of the drying or dehydrating acid of the system may be diverted from the drying cycle and returned to the sludge retort or gas generator 10' where SO₂ gas is regenerated therefrom and in turn returned to the system via the condenser 26 and dehydrator 33. I have also found that the return acid may be so predetermined in amount or/and dilution as to carry along therewith the aforesaid moisture overload, which moisture overload may be withdrawn or expelled from the system by way of the condenser 26. In this way the entire system may be self-contained in acid circulation and the excess or overload moisture may be removed from the system in amounts which permit the obtaining at will of any high strength acid, such, for example, as 20% oleum or higher.

To accomplish these results, the gas generator 10' is interconnected with the acid circulation system of the plant and desirably with the piping $a$ of the dehydrator 33 by means of a piping system $e$, the flow of acid through which may be controlled by means of a valve 52. The piping $e$ may be connected to the sludge inlet 22' or to the retort 10' in any other desired way. Where a plurality of dehydrating towers is employed, this piping $e$ is connected to the pipe system of the tower circulating the acid of lower strength.

The application of the principles of my present invention and the use of the system shown in Fig. 1 of the drawings may be further seen by consideration of the following examples. To simplify the explanation, it will be assumed that the system is capable of producing a conversion of 100% from SO₂ to SO₃ to H₂SO₄ and complete (100%) absorption of water in 98% acid. In actual practice the conversion of SO₂ to SO₃ will be about 96 to 98%, the conversion (absorption) of SO₃ to H₂SO₄ will be 97 to 99% and the absorption of water in 98% acid will be 99%+. The aforesaid assumed conversion applied also to the acid fed back to the retort or gas generator. In the calculations given, the gas expansion or contraction due to pressure changes is neglected as unimportant compared to the differences due to the temperature changes.

The following calculations of conversion will be used in the examples given below:

100 lbs. $H_2SO_4$ = 81.6 lbs. $SO_3$ + 18.4 lbs. $H_2O$
81.6 lbs. $SO_3$ is made from 65.3 lbs. $SO_2$ 100 lbs. 20% oleum = 85.3 lbs. $SO_3$ + 14.7 lbs. $H_2O$
85.3 lbs. $SO_3$ is made from 68.2 lbs. $SO_2$
85.3 lbs. $SO_3$ + 49.2 lbs. $H_2O$ =
134.5 lbs. 60° Baumé acid 100 lbs. 40% oleum = 89.0 lbs. $SO_3$ + 11.0 lbs. $H_2O$
89.0 lbs. $SO_3$ is made from 71.2 lbs. $SO_2$
89.0 lbs. $SO_3$ + 51.3 lbs. $H_2O$ =
140.3 lbs. 60° Baumé acid 100 lbs. 60° Baumé (77.67% $H_2SO_4$) =
63.4 lbs. $SO_3$ + 36.6 lbs. $H_2O$ 0.18264 lbs. $SO_2$ occupy 1 cu. ft. @ 32° F.
(and standard pressure)

The following tables are used in these calculations, Table 1 being for the 20% oleum example, and Table 2 being for the 40% oleum example:

*Table 1*

Volume in cu. ft. occupied by 68.2 lbs. $SO_2$ at various temperatures for various gas concentrations

| Temp. ° F. | Per cent $SO_2$ | | | |
|---|---|---|---|---|
| | 100% | 7% | 8% | 10% |
| 32 | 373.4 | | | |
| 70 | 402.5 | 5750 | 5031 | 4025 |
| 80 | 410.4 | 5863 | 5130 | 4104 |
| 90 | 417.8 | 5970 | 5222 | 4178 |
| 92 | 419.0 | 5986 | 5238 | 4190 |
| 96 | 421.9 | 6027 | 5274 | 4219 |
| 100 | 425.3 | 6076 | 5316 | 4253 |
| 110 | 433.1 | 6187 | 5414 | 4331 |

*Table 2*

Volume in cu. ft. occupied by 71.2 lbs. $SO_2$ at various temperatures for various gas concentrations

| Temp. ° F. | Per cent $SO_2$ | | | |
|---|---|---|---|---|
| | 100% | 7% | 8% | 10% |
| 32 | 389.8 | | | |
| 70 | 420.2 | 6003 | 5252 | 4202 |
| 80 | 428.4 | 6133 | 5355 | 4284 |
| 90 | 436.2 | 6231 | 5452 | 4362 |
| 100 | 444.0 | 6343 | 5550 | 4440 |
| 110 | 452.2 | 6460 | 5652 | 4522 |

*Table 3*

Water content of saturated air per cu. ft.

| Temp. ° F. | lbs. $H_2O$ |
|---|---|
| 70 | 0.00115 |
| 80 | 0.00156 |
| 90 | 0.00212 |
| 92 | 0.00225 |
| 96 | 0.00253 |
| 100 | 0.00283 |
| 110 | 0.00376 |

The system or process is manifestly capable of use in cases requiring both the addition and abstraction of water to and from the system respectively. Examples I to VI will serve to show the use of the system and process in those cases which do not require an abstraction of water from the system, but on the contrary require an addition of a make-up water to the system; and Examples VII and VIII will serve to exemplify the principles of the present invention requiring an abstraction of excess water from the system. The solution of the problems depends upon the strength of $SO_2$ gas produced in the process, the temperature at which the $SO_2$ gas leaves the condenser 26 and enters the dehydrating tower 33, and the strength of the product acid desired to be made. The cooling referred to in the examples given is that cooling attained by the gases at the exit end of the condenser 26.

*Example I.*—To make 100 lbs. 20% oleum from 7% $SO_2$, cooling to 70° F.

From Tables 1 and 3 it will be seen that 5750 cu. ft. × .00115 lbs. = 6.62 lbs. water will be carried over by the gas to the dehydrator. As this amount of water is less than the necessary amount of 14.7 lbs., no water need be removed from the system and in fact some make-up water must be added.

*Example II.*—To make 100 lbs. 20% oleum from 7% $SO_2$, cooling to 92° F.

Similarly, 5986 × 0.00225 = 13.46 lbs. water will be carried over by the gas to the dehydrator. For the reasons given with Example I, this is less than the necessary amount (14.7 lbs.) of water and no water need be abstracted from the system.

*Example III.*—To make 100 lbs. 20% oleum from 8% $SO_2$, cooling to 96° F.

Similarly, 5274 × .00253 = 13.34 lbs. of water will be carried over. With this example, no water need be abstracted.

*Example IV.*—To make 100 lbs. 20% oleum from 10% $SO_2$, cooling to 100° F.

Similarly, 4253 × .00283 = 12.04 lbs. water will be carried over. With this example, as well, no water need be abstracted.

*Example V.*—To make 100 lbs. 40% oleum from 7% $SO_2$, cooling to 80° F.

From Tables 2 and 3, it will be seen that 6133 × .00156 = 9.57 lbs. of water will be carried over. As this amount of water is less than the necessary amount of 11.0 lbs., no water need be removed; in fact some must be added.

*Example VI.*—To make 100 lbs. 40% oleum from 10% $SO_2$, cooling to 90° F.

Similarly, 4362 × .00212 = 9.25 lbs. of water will be carried over. For the reasons given with Example V, no water need be abstracted.

*Example VII.*—To make 100 lbs. 20% oleum from 7% $SO_2$, cooling to 100° F.

Here an excess of water will be carried over into the dehydrators.

Thus:

6076 × .00283 = 17.20 lbs water carried over
Permissible    14.7 lbs. water in oleum product
Therefore    2.5 lbs. water is the excess.

This example may be solved by a mathematical series but the applied solution may be considered more simply in the following ways, based upon producing and maintaining an acid strength in the circulating pipe system *b* of 20% oleum and an acid strength in the circulating pipe system *a* of 60° Baumé.

Taking 7.90 pounds of the 20% oleum from the product oleum, utilizing the same in the drying cycle to obtain a 60° Baumé acid, and diverting or returning the product to the gas generator through the pipe system *e*, the excess of 2.5 pounds of water will be abstracted from the system by the condenser 26 and removed through the water boot 29. Thus the 7.90 pounds of 20% oleum when diluted to 60° Baumé will contain 3.89 pounds of water, which amount of water will be carried by the diverted acid back into the gas generator. The diverted acid (10.63 pounds of 60° Baumé acid) will contain 6.74 lbs. $SO_3$, which will be re-generated by the gas generator into 5.39 lbs. $SO_2$. This 5.39 lbs. $SO_2$ will, however, carry back into the system via the condenser and dehydrator (at the 7% concentration of $SO_2$ at 100° F.), 1.36 lbs. of water (480×.00283). The condenser 26 therefore removes the difference between the amount of water contained by the diverted acid and the amount of moisture thus returned to the system, which is 2.53 lbs. (3.89 lbs.—1.36 lbs.)

The application of this solution may also be considered as follows:

6076×.00283=17.20 lbs. of water carried over by original amount $SO_2$
480×.00283= 1.36 lbs. of water carried over by the 5.39 lbs. $SO_2$
Therefore total is 18.56 lbs. water carried over into the dehydrator
lbs. permitted in product oleum 14.70
    3.86 lbs. excess to be removed by the dehydrated acid and to be returned to the retort Now, if no acid were returned to the retort, the condenser would remove $$A+B-17.20 \text{ lbs. of water}$$

where A is the water vapor in the combustion gases and B the water content of the feed sludge.

But with the foregoing amount of acid returned to the retort, the condenser removes $$A+B+3.86-18.56 \text{ lbs. of water}$$

Therefore the condenser removes more water by an amount equal to 2.5 lbs.

*Example VIII.*—To make 100 lbs. 20% oleum from 8% $SO_2$, cooling to 110° F.

Here too an excess of water will be carried over into the dehydrators.

Thus:

5414×.00376=20.36 lbs. water carried over
Permissible    14.7 lbs. water in product oleum
Therefore      5.66 lbs. water is the excess The complete solution of this problem is fully shown in the flow sheet of Fig. 2 of the drawings. Here the amount of 20% oleum diverted from the absorbers 40 to the dehydrators 33, 19.7 lbs. will be taken diluted to a 60° Baumé acid strength and diverted or returned to the sludge converter 10'.

Applying the solution of the problem in the same way as given with Example VII, we find 19.7 lbs. of 20% oleum converts to 26.47 lbs. of 60° Baumé acid, which amount of acid will carry 9.67 lbs. of water back into the sludge converter 10'. The 16.80 lbs. $SO_3$ thus returned to the converter is equivalent to 13.44 lbs. of re-generated $SO_2$; and this amount of re-generated $SO_2$ (at the given 8% $SO_2$ cooling to 110° F.) will, however, carry back into the system via the condenser and dehydrator 4.01 (1067×.00376) lbs. of water. The difference between the amount of water thus carried back to the sludge converter (9.67) and the amount of water thus returned to the system (4.01) is the amount of water which is removed from the system by the condenser 26, this being 5.66 lbs. which is the excess desired to be removed.

Considering the solution of this problem in the second manner discussed with Example VII, I find:

5414×.00376=20.36 lbs. of water carried over by 68.2 lbs. $SO_2$
1067×.00376= 4.01 lbs. of water carried over by returned 13.44 lbs. $SO_2$
Total         24.37 lbs. of water carried over
              14.7 lbs. permitted in product oleum Excess to be removed by the dehydrator and to be returned to the retort    9.67 lbs.

This is the amount contained by 60° Baumé acid made up from the 19.7 lbs. of 20% oleum and returned to the retort.

Now, if no acid were returned to the retort, the condenser would remove $$A+B-20.36 \text{ lbs. of water}$$

With the foregoing amount of acid returned to the retort, the condenser removes $$A+B+9.67-24.37 \text{ or } A+B-14.7 \text{ lbs. water}$$

Therefore the condenser removes more water by an amount equal to 5.66 lbs., which is the excess to be removed.

It will be noted that in Examples VII and VIII the quantities developed as the amount of 20% oleum to be used as the dehydrating agents refer to the quantities so used and subsequently decomposed into $SO_2$ and water, but do not refer to the total quantities used as dehydrants. It will be noted from Fig. 2 of the drawings that in addition enough of the make-up acid must be used in the dehydrator to recover the permissible water content and transfer back to the absorption tower through the pipe system d as this moisture must not be allowed to pass through the converter but must nevertheless be present in the absorber to produce the product acid from the dry $SO_3$.

It should also be noted that the product acid is reduced to 60° Baumé acid in the dehydration process, this to be contrasted with the customary use of a 66° Baumé acid as dehydrant. In principle the acid should be reduced to such a strength in the dehydration step as to minimize the quantity of returned $SO_3$ which is to be decomposed into $SO_2$ in the converter. A 60° Baumé acid strength is desirable, since if the acid were reduced to a lower strength there would be a loss of water absorption and if maintained at a higher strength a larger quantity of $SO_3$ would be required to be diverted to the gas generator. If none of the dehydrating acid need be decomposed (Examples I to VI supra) the drying acid in the dehydrator may be retained at 98% or at 66° Baumé strengths.

The practice of my improved process and the operation of the plant will in the main be fully apparent from the above detailed description thereof. The process may be used with acid sludge of different varieties such as liquid sludges, sludges of the more viscous type and even solid sludges. While the process has been described in connection with treatment of acid sludge, it will be understood that the process may be employed for the concentration of any weak sulphuric acid, particularly where an SO₂ gas is produced containing a moisture overload. The process may be used, for example, for the treatment of a by-product sulphuric acid, and particularly of weak sulphuric acid resulting from the pickling of steel. Heretofore acids of this type have been of little value, the strength of the acid being too low to permit of economical concentration. Such acids generally contain a large amount of salts and other impurities which render their utilization difficult. Such acids or salt solutions may be treated in my process by adding to them a reducing agent such as hydrocarbon oils. Sulphuric acid or oleum of the desired high concentrations may be produced therefrom. The process is also applicable to the concentration of ordinary weak sulphuric acid, the limit of economical concentration with other processes at the present time being ordinarily 93% $H_2SO_4$ though petroleum acid may be concentrated to 98% strength at great expense. Acids containing dissolved salts under prior practice can only be concentrated to points where the salt crystallizes out which frequently occurs at only moderate concentrations of the acid. By adding a small quantity of petroleum oil to the weak sulphuric acid, a petroleum acid sludge may be produced which may be treated in the system of my present invention for economically obtaining strong sulphuric acid or oleum.

It will be further understood that while I prefer to embody all of the principles of the invention in the apparatus and process as described, the process and apparatus may be widely varied to employ any one or a number of these principles in combination to effect any one or a number of the advantages flowing therefrom, all as I have attempted to define in the following claims.

I claim:

1. In the process of making a highly concentrated sulphuric acid or oleum from a moisture loaded sulphur dioxide gas in a system wherein a moisture loaded SO₂ gas is produced in a gas generator, by the reduction of SO₄ compounds with an excess of reducing agent, is subsequently passed through a water condenser, wherein moisture is removed from the gas, and the gas exiting from the condenser and containing an overload of moisture is then passed through a sulphuric acid dehydrator, wherein the moisture overload is taken up by the sulphuric acid therein, the steps which comprise returning the acid containing the moisture overload to the contents of the gas generator, regenerating SO₂ gas therefrom in said gas generator, passing the regenerated SO₂ gas through the water condenser and withdrawing the moisture overload from the system by means of the condenser.

2. The contact process of making a highly concentrated sulphuric acid or oleum product from a moisture overloaded sulphur dioxide gas which consists in producing an initial moisture loaded SO₂ gas from acid sludge from the sulphuric acid purification of hydrocarbonaceous material in a gas generator, flowing the thus generated gas through a water condenser wherein moisture is removed from the gas, the gas exiting from the condenser containing an overload of moisture, adding sufficient oxygen for the contact sulphuric acid process to the gas, flowing the gas mixture through a dehydrator, subjecting the dehydrated gases to the action of a catalyst at reaction temperatures for the conversion of SO₂ to SO₃, and then flowing the SO₃ produced through an absorber wherein the product acid is obtained, utilizing part of the product acid of the system in the dehydrator for the removal of the moisture in the gas, sending dilute acid obtained from the dehydrator and containing the moisture overload to the acid sludge in the gas generator, regenerating SO₂ gas therefrom in said gas generator and returning the regenerated SO₂ gas to the system, the acid sent to the gas generator carrying a water content substantially equal to the moisture overload carried into the dehydrator, the excess moisture carried over by the dehydrator acid being removed from the system by the condenser.

3. The process of making highly concentrated sulphuric acid or oleum which comprises generating at one point in a sulphuric acid system a moisture laden sulphur dioxide gas by the reduction of SO₄ compounds, including a portion of the acid produced in the system, in the presence of an excess reducing agent, passing the gas through a condenser maintained at a temperature below the boiling point of water, passing the gases from the condenser, admixed with sufficient oxygen-containing gas for the contact sulphuric acid process, through a dehydrator irrigated with strong sulphuric acid produced in the system, passing the dehydrated SO₂ gas through a contact sulphuric acid process, absorbing the SO₃ produced in sulphuric acid fed by a portion of the dehydrator acid, and passing sufficient of the dehydrator acid to the point in the system where the SO₄ compounds are being reduced so that all the water will be liberated and removed by the condenser over and above that required in the absorber to produce a product acid of the desired strength.

4. A method according to claim 3 in which the SO₂ is generated by the thermal decomposition of an acid sludge from the sulphuric acid purification of hydrocarbonaceous material.

5. A method according to claim 3 in which the SO₂ gas is produced by the thermal decomposition of acid sludge from the sulphuric acid purification of petroleum products.

INGENUIN HECHENBLEIKNER.